(12) United States Patent
Chennupati et al.

(10) Patent No.: US 12,143,703 B2
(45) Date of Patent: Nov. 12, 2024

(54) CAMERA MODULES WITH INTERLOCKED FRAMES

(71) Applicant: Apple Inc., Cupertino, CA (US)

(72) Inventors: Nitin Kumar Chennupati, Mountain View, CA (US); Hiran R Rathnasinghe, Lemon Grove, CA (US); Nicholas D. Smyth, San Jose, CA (US); Kevin Garrison, Santa Clara, CA (US); Jeffrey P. Bosco, San Diego, CA (US); Julien C. Vittu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 18/124,983

(22) Filed: Mar. 22, 2023

(65) Prior Publication Data

US 2024/0323506 A1 Sep. 26, 2024

(51) Int. Cl.
*H04N 23/55* (2023.01)
*H04M 1/02* (2006.01)
*H04N 23/51* (2023.01)

(52) U.S. Cl.
CPC ............. *H04N 23/55* (2023.01); *H04N 23/51* (2023.01); *H04M 1/0264* (2013.01)

(58) Field of Classification Search
CPC ........ H04N 23/55; H04N 23/57; H04N 23/51; G03B 17/561; H04M 1/0264
See application file for complete search history.

(56) References Cited

U.S. PATENT DOCUMENTS

| | | | |
|---|---|---|---|
| 5,311,367 A | 5/1994 | Ohki et al. | |
| 6,799,902 B2 | 10/2004 | Anderson et al. | |
| 7,997,730 B2 | 8/2011 | Cleveland | |
| 9,386,921 B2 | 7/2016 | Cleveland | |
| 9,651,756 B2* | 5/2017 | O'Neill | G02B 7/14 |
| 9,661,196 B2* | 5/2017 | Han | H04N 23/55 |
| 9,740,026 B2 | 8/2017 | Juan, Jr. et al. | |
| 10,481,410 B2 | 11/2019 | Kim et al. | |
| 10,670,879 B2 | 6/2020 | Goldenberg et al. | |
| 10,819,889 B2* | 10/2020 | Chen | H04N 23/45 |
| 11,053,022 B2 | 7/2021 | Bin et al. | |
| 11,125,970 B2 | 9/2021 | Nagayama et al. | |
| 11,650,393 B2* | 5/2023 | Chang | H04N 23/687 |
| | | | 359/557 |
| 2014/0253799 A1* | 9/2014 | Moon | H04M 1/0264 |
| | | | 348/376 |
| 2015/0015779 A1* | 1/2015 | Duan | H04N 23/57 |
| | | | 348/374 |
| 2020/0021721 A1* | 1/2020 | Chen | H04N 23/54 |
| 2021/0294113 A1* | 9/2021 | Park | G02B 27/646 |
| 2024/0176093 A1* | 5/2024 | Hu | G02B 5/005 |

* cited by examiner

*Primary Examiner* — Chiawei Chen
(74) *Attorney, Agent, or Firm* — Brownstein Hyatt Farber Schreck, LLP

(57) ABSTRACT

A camera module may have an optical assembly, an image sensor, and a frame, where the frame includes a reinforcement member and a base member that collectively form a sidewall of the frame. The reinforcement member defines a portion of the sidewall of the frame, a peripheral edge, and an opening. The base member may define another portion of the sidewall and extend through the opening and surround the peripheral edge of the reinforcement member. The optical assembly may be coupled to the sidewall of the frame.

20 Claims, 16 Drawing Sheets

CAMERA MODULES WITH INTERLOCKED FRAMES

FIELD

The described embodiments relate to camera modules and frames that support optical assemblies in camera modules. More specifically, the described embodiments relate to frames that utilize interlocked structures.

BACKGROUND

Most portable electronic devices, such as smartphones, tablets, and computers, have one or more cameras. These cameras increasingly allow a user to capture high quality images and/or videos while fitting within a small space of the portable electronic device. Some cameras may include optical assemblies with heavy or complicated optical elements, such as lenses, prisms, or the like, to provide desired image capture quality or features. These optical assemblies can be subject to unwanted motion during impact or shock events (such as accidentally dropping a portable electronic device). A camera module may incorporate structures to support and hold a portion of an optical assembly within a camera module but these structures may add to the dimensions of the camera module. Thus, it may be desirable to provide compact structures that are designed to hold an optical assembly of a camera module.

SUMMARY

A camera module may include an optical assembly with an optical element, an image sensor positioned to receive light through the optical assembly, and a frame having a sidewall. The frame may include a reinforcement member that may define a first portion of the sidewall of the frame, an opening, and a peripheral edge. The frame may also include a base member extending at least partially through the opening and surrounding at least a portion of the peripheral edge of the reinforcement member. The base member may define a second portion of the sidewall of the frame. The optical assembly may be coupled to the sidewall of the frame.

In some embodiments, the opening of the camera module may extend from a first surface of the reinforcement member to a second surface of the reinforcement member and the opening may be bound by a tapered perimeter edge of the reinforcement member that is positioned at a non-perpendicular angle to each of the first surface of the reinforcement member and the second surface of the reinforcement member. In some examples, a portion of the reinforcement member may curve inwardly from an inside surface of the sidewall and the base member may extend through the opening and fill the portion of the reinforcement member that curves inwardly to embed the portion of the reinforcement member into the sidewall.

As another example, a portion of the reinforcement member may protrude through the base member to an outside surface and the protruding portion of the reinforcement member may form an anchor against the base member. In some embodiments, the reinforcement member is made from metal. The base member may be made from a polymer. The peripheral edge of the reinforcement member may define at least one ridge and the base member may extend around the at least one ridge. The opening of the camera module may be a through opening and the base member may extend through the opening. The base member and the reinforcement member may form a flush surface at an inside surface of the sidewall.

A frame, such as described herein, may be configured to support an optical assembly. The frame may include at least one optical element and define an inside perimeter to which the optical assembly is coupled. The frame may also include a reinforcement member defining a first surface of the inside perimeter and defining an opening and a base member coupled to the reinforcement member. In some examples, a first portion of the base member fills the opening of the reinforcement member and the first portion of the base member defines a second surface of the inside perimeter.

In some embodiments, the opening defines a first end positioned at the first surface of the inside perimeter and a second end opposite the first end. The opening may extend from the first end to the second end and a cross-sectional area the opening may increase in a direction away from the first surface. In some examples, the first surface of the inside perimeter and the second surface of the inside perimeter are flush. The base member may extend through the opening and over a portion of the reinforcement member to define the second surface of the inside perimeter. The inside perimeter may be larger than the second surface of the inside perimeter.

In some cases, the reinforcement member may be a first reinforcement member and the opening may be a first opening. A second reinforcement member may define a third surface of the inside perimeter and define a second opening. Also, the base member may be coupled to the second reinforcement member, a second portion of the base member may fill the second opening of the reinforcement member, and the second portion of the base member may define a fourth surface of the inside perimeter.

A camera module may have an optical assembly with an optical element, an image sensor receiving light through the optical assembly, and a sidewall defining an inside surface and a top surface. The optical assembly may be coupled to the inside surface. The sidewall may include a reinforcement member that defines at least one opening, a first portion of the inside surface, and a first portion of the top surface. The sidewall may also include a base member that defines a second portion of the inside surface and a second portion of the top surface. A first portion of the base member may extend at least partially into the at least one opening of the reinforcement member to interlock the base member with the reinforcement member.

In some examples, the opening may be a plurality of openings arranged as an array. The base member may extend into each opening of the plurality of openings. In some cases, the sidewall defines a cavity and at least partially encircles the optical assembly. The camera module may include a shelf that at least partially defines a portion of the cavity and extends from a first side of the cavity to an opposite side of the cavity, the shelf configured to at least partially support the optical assembly.

In other embodiments, the reinforcement member defines an end. The end of the reinforcement member may extend partially through a portion of the base member at the top surface to interlock the base member with the reinforcement member at the end. In some cases, the strength of the reinforcement member is larger than a strength of the base member. The reinforcement member of the camera module may define a stepped cross-sectional area of the opening.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
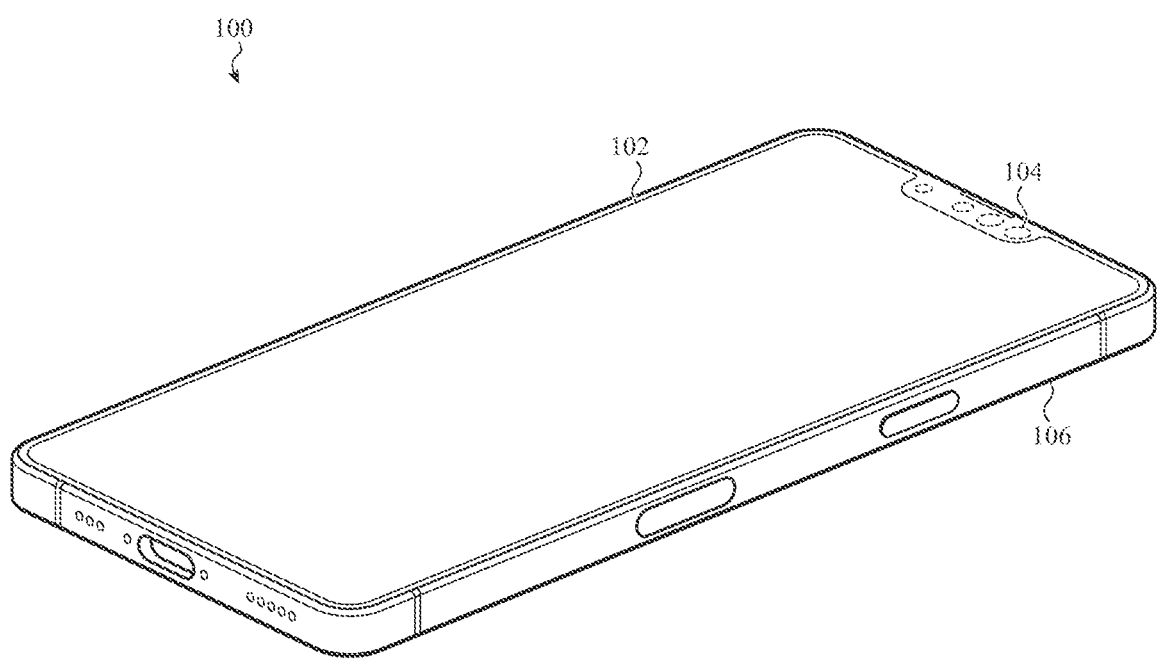
FIGS. 1A and 1B show front and rear perspective views, respectively, of an example of an electronic device that includes a camera module, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described here are camera modules and frames that support optical assemblies in camera modules. The camera modules described herein may be utilized in electronic devices, such as phones, tablets, laptops, and so on. In some embodiments, the camera module includes a frame, an optical assembly, and an image sensor. The frame supports the optical assembly within the camera module, and may set a position of the optical assembly relative to an image sensor of the camera module. For example, the frame may include a sidewall that defines an inner cavity, and the optical assembly may be positioned at least partially inside of the cavity. The optical assembly may be connected to the sidewall to fix the optical assembly relative to the frame.

The frame may act to maintain the positioning of the optical assembly of the camera module during unintended camera motion (e.g., resulting from impact and/or shock events, such as a user dropping an electronic device that includes the camera module). In general, the frame includes a base member formed from a first material and a reinforcement member that is formed from a second material and that defines one or more portions of the sidewall of the frame. In some instances, the reinforcement member is formed from a metal, and the optical assembly is connected to the reinforcement member. This may allow for the use of metal-to-metal adhesives or metal-to-glass adhesives between the frame and the optical assembly, which may provide a stronger bonding connection as compared to metal-to-plastic adhesives or plastic-to-glass adhesives, respectively.

The base member and the reinforcement member(s) may collectively contribute to overall strength and flexibility of the frame. Unintended motion of the camera module may apply forces to the optical assembly that may urge the optical assembly to move relative to the frame (and with it, the rest of the camera module). To prevent damage to the camera, it is desirable for the frame to be able to accommodate these forces while maintaining its mechanical integrity and its connection to the optical assembly. Accordingly, in some instances, the frame is configured such that both the base member and the reinforcement member form respective portions of the sidewall of the frame, which may impart a balance of strength and flexibility to the sidewall of the frame.

Depending on the relative forces applied to the optical assembly during unexpected motion, it may be possible for the reinforcement member at least partially to delaminate or otherwise separate from the base member. For example, delamination happens when the forces applied by the optical assembly exceed the retention forces between the reinforcement member and the base member that keep these members coupled. This may adversely impact the operation of the camera module, such as by causing misalignment between the optical assembly and the image sensor or otherwise interfering with movement of other components in the camera module. For example, the camera module may be configured to move the image sensor within the camera module. For example, the camera module may include an actuator that is capable of moving the image sensor within the camera (e.g., relative to the frame and the optics assembly) to facilitate autofocus and/or image stabilization operations of the camera module. Delamination of the reinforcement member may interfere with actuation of the image sensor, such as by reducing the range of motion of the image sensor.

Accordingly, in some embodiments described herein, the frame may be configured to improve the retention forces between the reinforcement member and the base member. The reinforcement member may include a peripheral edge that is positioned in a sidewall of the frame, such that the base member contacts the peripheral edge. Additionally, the reinforcement member may define one or more openings that extend at least partially through the reinforcement member. The base member may be configured to extend at least partially through each opening and contact at least a portion of a perimeter edge of each opening. The contact between the base member and the peripheral edge of the reinforcement member, as well as the perimeter edge of the opening, creates an interface between the reinforcement member and the base member that increases the retention force between these members. For example, the base member is molded around at least a portion of the reinforcement member. When the base member contracts as part of the insert molding process, it may apply a compressive force against the reinforcement member at certain interfaces between the reinforcement member and the base member. As the surface area at these interfaces increases, for example by defining openings in the reinforcement member, the grip between the base member and the reinforcement member increases. Similarly, one or more edges of the reinforcement member (e.g., the peripheral edge and/or a perimeter edge of an opening) may include ridges and other features that further increase the surface area and/or connection strength of the interface between the reinforcement member and the base member. As a result of this configuration, the frame described herein is less prone to delamination and can better protect the optical assembly and/or image sensor during unexpected movements. While openings in the reinforcement member to improve resistance to delamination are described herein, other alternatives and combinations are envisioned.

These foregoing and other embodiments are discussed below with reference to FIGS. 1A-6D. However, those skilled in the art will readily appreciate that the detailed description given herein with respect to these figures is for explanation only and should not be construed as limiting.

Figure 1B:
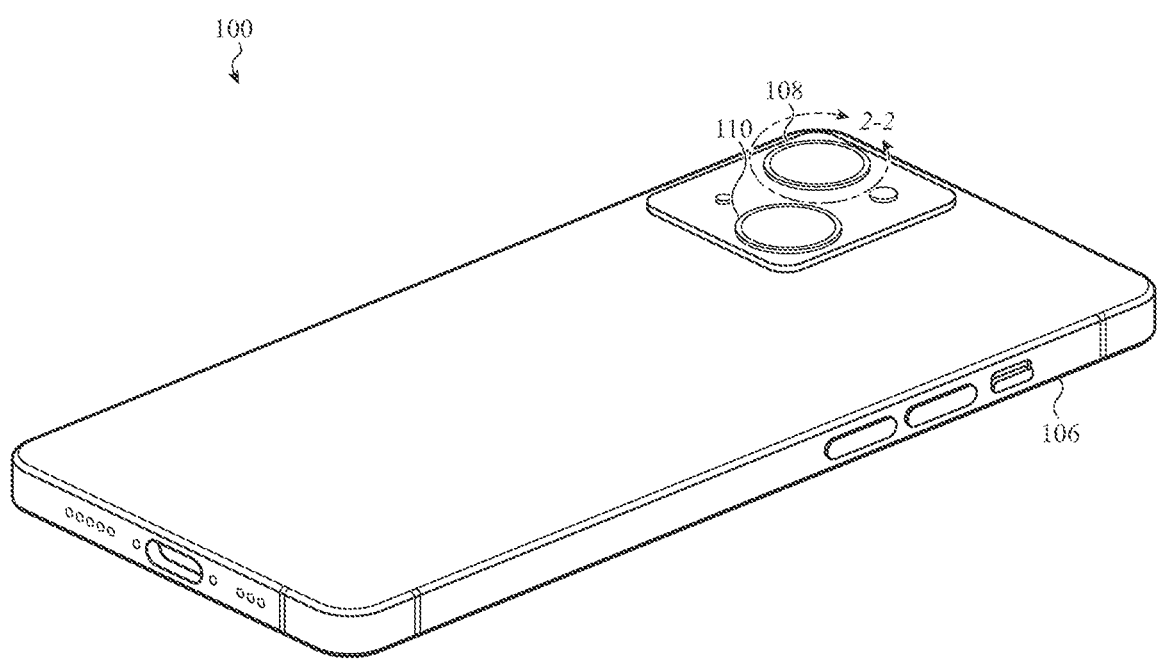

FIGS. 1A and 1B depict an example device 100 which may include one or more camera modules, such as described herein. FIG. 1A shows a perspective view of the front of the device 100 and FIG. 1B shows a perspective view of the rear of the device 100. The front of the device includes a display 102, a front-facing camera module 104, and a housing 106, while the rear of the device includes first and second rear-facing camera modules 108, 110. In some embodiments, the housing 106 partially encloses the electronic components of the device 100, including the front facing camera module 104 and the rear-facing camera modules 108 and 110. The display 102 provides a graphical output to a user. For example, the display may show a video stream captured by the camera. Each of these cameras may include an optical assembly, an image sensor, and a frame that supports the optical assembly.

More generally, the device 100 may include additional components such as memory, one of more processors, one or more sensors, and the like, however these components will not be described in detail herein. In some embodiments, the device 100 may include a network interface that enables the device 100 to transmit data and to receive data from networks. While the device 100 is depicted as a phone in FIGS. 1A and 1B, the camera module may be included in other electronic devices. For example, the camera module may be utilized in a personal computer, a desktop computer, a laptop, a notebook, a tablet, a camera, a virtual reality headset, a video game console, a television, speakers, and so on.

Figure 2:
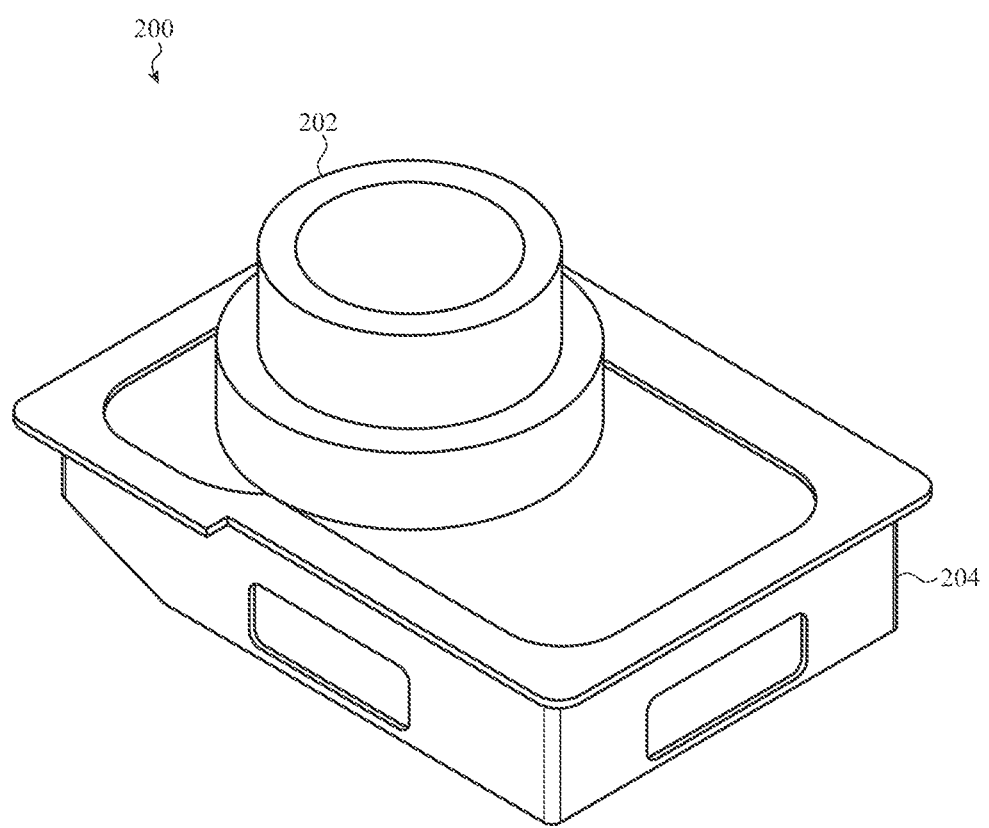
FIG. 2 shows a perspective view of an example camera module that includes an optical assembly and a frame, such as described herein.

FIG. 2 shows a portion of an example camera module that can be used in an electronic device described herein, such as device 100. The camera module 200 comprises an optical assembly 202, a frame 204, and an image sensor (not shown). Additionally, the camera module may include a housing that may be configured to at least partially enclose the various components of camera module 200 (e.g., the optical assembly 202, the frame 204, and the image sensor) and in some variations may act to shield internal components from electromagnetic interference (as well as to shield other components or devices external to the housing from electromagnetic interference originating within the camera module 200). The housing may be coupled to the frame 204 such that the frame 204 is held in a fixed relationship to the housing. It should be appreciated that the camera module 200 may include additional components that are not depicted in FIG. 2, such as an actuator configured to move the image sensor within the camera module 200, a flex circuit for routing signals (e.g., power and/or image data) to and from the camera module 200, or the like.

The optical assembly 202 includes at least one optical element and is configured to direct light received by the camera module 200 toward the image sensor. The optical assembly 202 may include one or more lens elements. Additionally or alternatively, the optical assembly 202 may include one or more light folding elements such as mirrors or prisms to redirect light captured by the camera. In these instances, the optical axis of the camera module 200 may extend along multiple directions (i.e., a light folding element such as a prism or mirror may change the direction of the optical axis). The optical assembly 200 may include a lens holder that houses the various optical elements of the optical assembly 200. In some instances, the lens holder may serve to hold some or all of the optical elements in a fixed relationship.

The optical assembly 202 is coupled to the frame 204, such as described herein, to fix the position of the optical assembly 202. For example, the optical assembly 202 may be fixedly coupled to the frame 204 using an adhesive. The optical assembly 202 may be positioned to extend at least partially into a cavity defined by the frame 204, though in some instances it should be appreciated that a portion of the optical assembly protrudes from the cavity. It should also be appreciated that the camera module 200 may include one or more optical elements (e.g., one or more lenses) that are not coupled to the frame 204. In these instances, the camera module 200 may include multiple optical assemblies where the optical assembly 202 is coupled to the frame and another optical assembly (or multiple assemblies) is not coupled to the frame 204. These optical assemblies may collectively route light received by the camera module 200 to the image sensor.

The image sensor may receive light through the optical assembly 202 (as well as through any additional optical assemblies positioned along the optical axis of the camera module 200), and may generate one or more signals that may convey information about the light received during imaging. The image sensor may be any suitable sensor, such as a CCD, CMOS sensor, or the like. As mentioned above, the image sensor may be configured to move within the camera (e.g., relative to the optical assembly 202 and/or the frame 204). In some instances, this movement may adjust the camera's focus, which may allow the camera module 200 to provide autofocus capabilities. Additionally or alternatively, the image sensor may be moved relative to the optical assembly 202 in one or more directions perpendicular to the optical axis of the camera module 200, which may allow the camera module 200 to provide optical image stabilization capabilities.

In these instances, the camera may also have an actuator assembly (not shown) that moves the image sensor within the camera module 200. The actuator is configured to generate the forces to move the image sensor, and may comprise a voice coil motor (VCM), a comb drive, or the like. In embodiments where the actuator comprises a voice coil motor, the voice coil motor may comprise a magnet and a coil, one of which may be fixed relative to the image sensor (either via a direct connection to the image sensor, or via an indirect connection via one or more intervening components) and the other of which may be fixed within the camera module 200 in a manner that allows the image sensor to move relative thereto. The coil may be positioned within the magnetic field of the magnet such that, when current is driven through the coil, a Lorentz force is generated that can create relative movement between the coil and magnet, which in turn may move the image sensor within the camera. In some embodiments, the camera module 200 may include one or more suspension structures and/or one or more actuators that allow the image sensor to move relative to the optical assembly to perform an auto focus function.

It should be appreciated that, in some variations, one or more portions of the actuator assembly may be connected to the frame 204. For example, one or more magnets of a voice coil motor used to actuate the image sensor may be coupled to the frame 204. Additionally or alternatively, the image sensor may be suspended relative to the frame using one or more suspension structures that are connected to the frame 204.

Due to constraints on the desired size, shape, and mechanical characteristics of the frame 204, it may be desirable to form the frame 204 from two different materials. Accordingly, the frames of the camera modules described herein include two members formed from different materials, a reinforcement member and a base member, that form a composite structure. While example materials are discussed in more detail herein, the reinforcement member and the base member are generally made from a metal and a polymer, respectively. This composite structure is beneficial because it is a strong yet small structure that can support the weight of relatively heavy optical assemblies within the camera module.

Figure 3A:
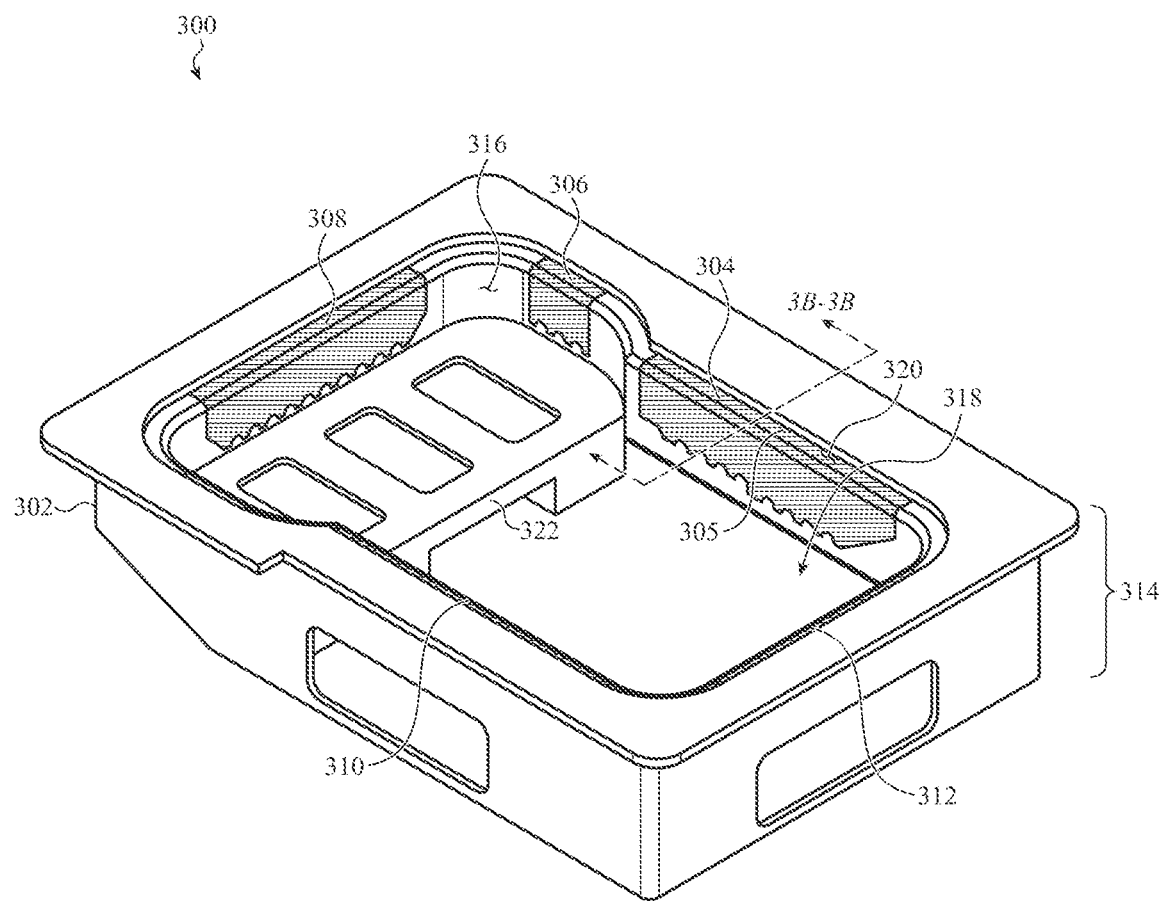
FIG. 3A shows a perspective view of a frame configured for use in a camera module.

FIG. 3A shows a perspective view an example frame 300 that may be used in the camera modules described herein (e.g., which may be used as frame 204 in the camera module 200 of FIG. 2). As described above, the frame 300 may be used to hold an optical assembly within a camera module. It may be desirable to configure the frame 300 such that it is able to accommodate forces applied to the optical assembly during certain impact or shock events without breaking or separating from the optical assembly.

In some embodiments, the frame 300 includes a base member 302 and a reinforcement member 304. The frame 300 may include a single reinforcement member 304, or may be formed from multiple separate components. For example, reinforcement member 304 shown in FIG. 3A includes multiple additional segments (e.g., segments 306, 308, 310, and 312) that are part of a monolithic piece with a first segment 305, where each segment forms a different exterior surface of the frame 300. In other variations, each of these additional segments may be formed as a separate piece, thereby collectively forming a plurality of reinforcement members that are held in place by the base member 302.

The frame 300 is shaped to define a cavity 318 extending at least partially therethrough. Specifically, the frame includes a top surface 320 and a sidewall 314, where the sidewall 314 defines a perimeter of the cavity 318. The base member 302 and the reinforcement member(s) 304 may each form a respective portion of the sidewall 314 of the frame 300. For example, the base member 302 may form a first portion of the sidewall 314 and the reinforcement member 304 may form a second portion of the sidewall 314. Similarly, the base member 302 defines a first portion of the inside surface 316 of the sidewall 314 and the reinforcement member 304 defines a second portion of the inside surface 316 of the sidewall 314. It should be appreciated that in some instances different segments of the reinforcement member 304 may form non-contiguous portions of the inside surface 316 of the sidewall 314 (e.g., the additional segments 306, 308, 310, and 312 may each form a different corresponding portion of the inside surface 316 in addition to the portion formed by segment 305).

Generally, the inside surface 316 of the sidewall 314 of the frame 300 (and with it, the cavity 318) may have any suitable cross-sectional shape, which may be rectangular, circular, square, polygonal or any other shape that accommodates the geometry of the optical assembly. When an optical assembly is positioned to extend at least partially within the cavity 318, the sidewall 314 at least partially encircles the optical assembly. Accordingly, when the camera module is assembled, the sidewall 314 (and with it, the inside surface 316 of the sidewall 314) at least partially encircles the optical assembly.

The optical assembly may be connected to the inside surface 316. For example, an adhesive may be used to bond the optical assembly to the frame. In some of these variations, the adhesive may be positioned such that it bonds a portion of the optical assembly to a portion of the reinforcement member 304. This may allow for stronger bonding between the optical assembly and frame 300. For example, if the reinforcement member 304 is made from a metal, a metal-to-metal adhesive may be used to bond the reinforcement member 304 to a metal surface of the optical assembly (e.g., a metal surface of a lens holder) or a metal-to-glass adhesive to bond the reinforcement member 304 to a glass surface of the optical assembly (e.g., a glass surface of an optical element such as a prism). These bonds may be stronger than a similar connection to a plastic portion of the frame 300.

As mentioned previously, the frame 300 also defines a top surface 320. While one or more portions of the reinforcement member 304 (such as segments 305, 306, 308, 310, and/or 312) may form at least a portion of the top surface 320, it should be appreciated that in other instances the base member 302 may form some or all of the top surface 320. The top surface may be used to attach additional components to the camera module, such as a segment of a housing of the camera module. In some instances, the frame includes a curved transition between the inside surface 316 and the top surface 320. The curved transition may prevent stress concentrations that can crack or break the reinforcement member during an impact, shock event, or unwanted movement event (e.g. dropping of the electronic device), and thus increases the flexibility of the frame.

In some embodiments, the frame 300 is formed using an insert molding process in which the base member 302 is molded around the reinforcement member 304. The reinforcement member 304 (or multiple reinforcement members) are pre-made prior and then positioned in a mold, which holds the reinforcement member(s) 304 in place during forming of the base member 302. The base member 302 may be formed by a material, such as a thermoplastic resin, that is injected in the cavity of the mold. The thermoplastic resin fills the cavity of the mold and forms around certain surfaces of the reinforcement member(s) 304. As the material of the base member 302 solidifies, the material of the base member 302 contracts around surfaces of the reinforcement member(s) 304. This compression may act to couple the base member 302 to the reinforcement member 304. The retention or coupling strength between the base member and the reinforcement member depends in part on the surface area across which the reinforcement member(s) 304 (e.g., at its edges) contacts the base member 302. As a result of the insert molding process, the base member may be a monolithic piece. However, other embodiments are possible. For example, the base member 302 may be composed of a series of separate pieces that are formed individually and coupled together (e.g., fastened, welded, interlocked, and so on).

In general, the reinforcement members described here may be made from a metal. For example, the reinforcement member 304 may be made from steel, aluminum, and/or any metal alloy or combination thereof. The reinforcement member may be formed from a thin sheet of metal that is deformed or otherwise manipulated to form the overall shape of the reinforcement member 304. The base member 302 may be made from a polymer material, such as thermoplastics, a polymer composite, and or the like. For example, the base member may be formed from polypropylene, polyethylene, polycarbonate, and/or the like. Accordingly, the reinforcement member 304 may be stronger and more flexible than the base member 302, but may be formed into a more limited range of shapes, whereas the base member 302 may be molded into any of a wide variety of shapes. The reinforcement member 304 and the base member 302 cooperate to define the mechanical properties of the frame, though the reinforcement member 304 may impart greater strength to the frame 300 than the base member 302. During impact or shock events of the camera module, the reinforcement member may absorb the majority of the load from the movement of the optical assembly.

Returning to FIG. 3A, in some examples, the frame 300 includes a shelf 322. The shelf 322 may be positioned below the top surface 320 of the frame 300, and may at least partially define the cavity 318. The shelf 322 may support the optical arrangement. For example, a portion of the optical assembly may contact a top surface of the shelf 322. Additionally or alternatively, the shelf may also provide additional rigidity and/or stiffness to the frame. The shelf may extend across a portion of the cavity 318 from one side of the inside perimeter to an opposite side of the inside perimeter. In some embodiments, the shelf generally follows the profile of the inside perimeter and occupies a surface area defined by the cavity of less than ¼, less than ½, or less than ⅓ of the surface area of the cavity.

Figure 3B:
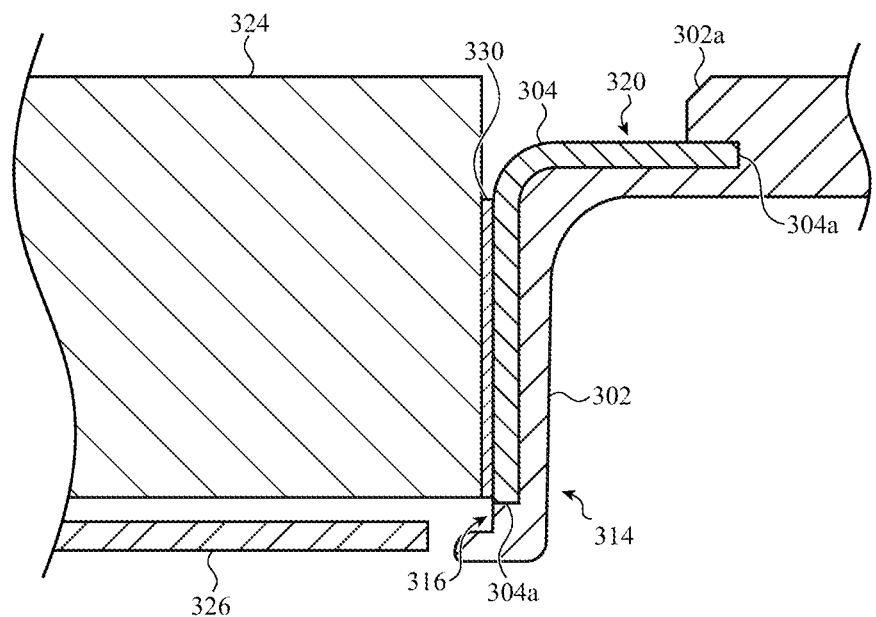
FIGS. 3B and 3C show cross-sectional views of the frame incorporated into a camera module with an optical assembly.
Figure 3C:
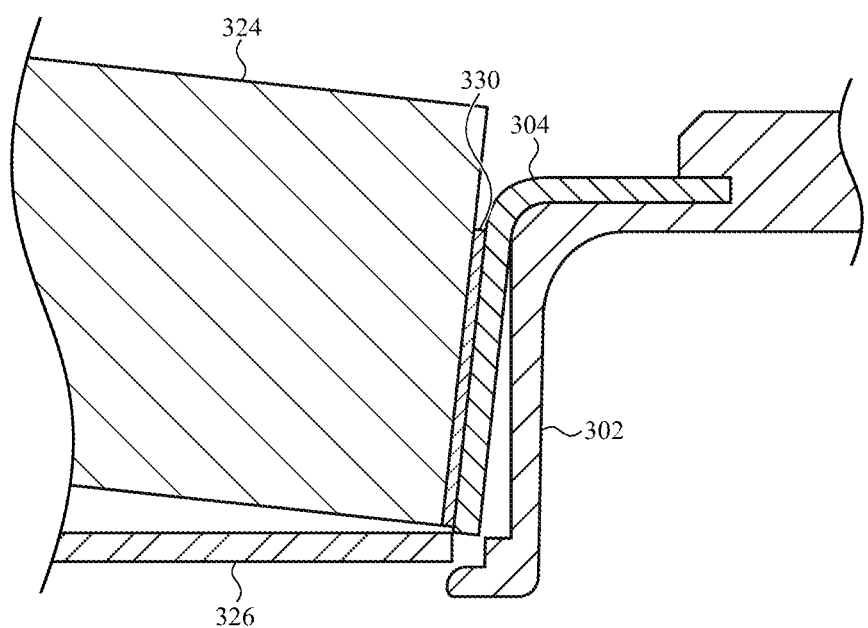

FIGS. 3B and 3C depict cross-sectional views of the frame 300, taken along line 3B-3B, incorporated into a camera module that includes an optical assembly 324 and an image sensor 326. FIGS. 3B and 3C illustrate how movement of the optical assembly 324 with respect to the camera module and to the frame 300 during an impact or shock event may cause delamination of the base member 302 and the reinforcement member 306.

As shown in FIG. 3B, the optical assembly 324 is coupled to the inside surface of the sidewall 316. In some embodiments, the optical assembly 324 is coupled to the inside surface 316 of the sidewall 314 via an adhesive layer 330. Depending on where the adhesive layer 330 is positioned between the frame 300 and the optical assembly 324, the optical assembly 324 may be adhered directly to the reinforcement member 304, and optionally also directly to the base member 302. For example, in one or more portions of the inside surface 316 of the sidewall 314 formed by the reinforcement member 304, the optical assembly is adhered directly to the reinforcement member. Optionally, in one or more portions of the inside surface 316 formed by the base member 302, the optical assembly 324 is adhered to the base member. Because the bond between the reinforcement member 304 and the optical assembly 324 may be stronger than a similar bond between the base member 302 and the optical assembly 324, it may be desirable to prioritize placement of the adhesive between the reinforcement member 304 and the optical assembly 324. For example, the adhesive layer 330 may be positioned such that a majority of the bonding area between the optical assembly 324 is and the frame 300 is the result of direct adherence to the reinforcement member. This configuration can improve the performance of the frame in shock events.

In general, the reinforcement member 304 has a first surface, a second surface opposite the first surface, and a peripheral edge 304a extending between the first surface and the second surface. The first surface may form a portion of the inside surface 316 of the sidewall 314, and optionally a portion of the top surface 320 of the frame 300. These surfaces of the reinforcement member 304 may facilitate coupling between the reinforcement member 304 and the base member 302. For example, within the sidewall 314, the base member 302 may contact the second surface and the peripheral edge 304a of the reinforcement member 304, whereas the first surface of the reinforcement member 304 may be exposed to define a portion of the inside surface 316 of the sidewall 314. Specifically, the peripheral edge 304a defines an interface between the reinforcement member 304 and the base member 302, in which compressive forces caused by the shrinkage of the base member 302 during manufacturing may help hold the reinforcement member 304 in place relative to the base member 302. Similarly, at the top surface 320 of the frame 300, a portion 302a of the base member 302 may surround at least a portion of the first surface, the second surface, and the peripheral edge 304a of the reinforcement member 304. This may help to hold the frame 300 in place relative of the base member 302 in an upper region of the frame 300.

As will be described in more detail below, the peripheral edge 304a may have a profile (e.g., a beveled profile, a chamfered profile, a filleted profile, or the like), which may improve the coupling between the reinforcement member 304 and the base member 302. In these embodiments, the base member 302 may mold to the profile of the peripheral edge 304a, increasing the surface area between the reinforcement member 304 and the base member 302 and/or changing the orientation of the contacting surfaces of the reinforcement member 304 and the base member 302. This may increase the resistance to delamination of the reinforcement member 304 from the base member 302.

During unanticipated motion of the camera module, it is desirable for the frame to maintain its connection to the optical assembly 324 while maintaining its structural integrity. Accordingly, it may desirable for the reinforcement member 304 and the base member 302 to deflect together when accommodating the forces applied to the optical assembly 324. Depending on the design of the camera modules and the magnitude of the motion, it may be possible for the reinforcement member 304 to delaminate from the base member 302 within the sidewall, such as illustrated in FIG. 3C. In this example, the optical assembly 324 is shifted in a direction away from the sidewall 314 (e.g., due to impact or a shock event). The bonding between the optical assembly 324 and the reinforcement member 304 may be sufficient such that these components remained bonded, such that as optical assembly 324 twists with respect to the frame, the reinforcement member flexes to accommodate the movement of the optical assembly 324. As the reinforcement member flexes, the friction between the peripheral edges and the base member may be insufficient to keep the reinforcement member 304 and the base member 302 coupled in the sidewall 314. As a result, the reinforcement member may delaminate from the base member, and the optical assembly 324 and reinforcement member 304 may deviate from their intended positioning within the camera module. This may cause the optical assembly 324 and/or reinforcement member 304 to interfere with other components of the camera module, such as the image sensor 326. As explained above, the delaminated reinforcement member may hinder the range of motion of the image sensor and affect the operation of the camera.

Figure 4A:
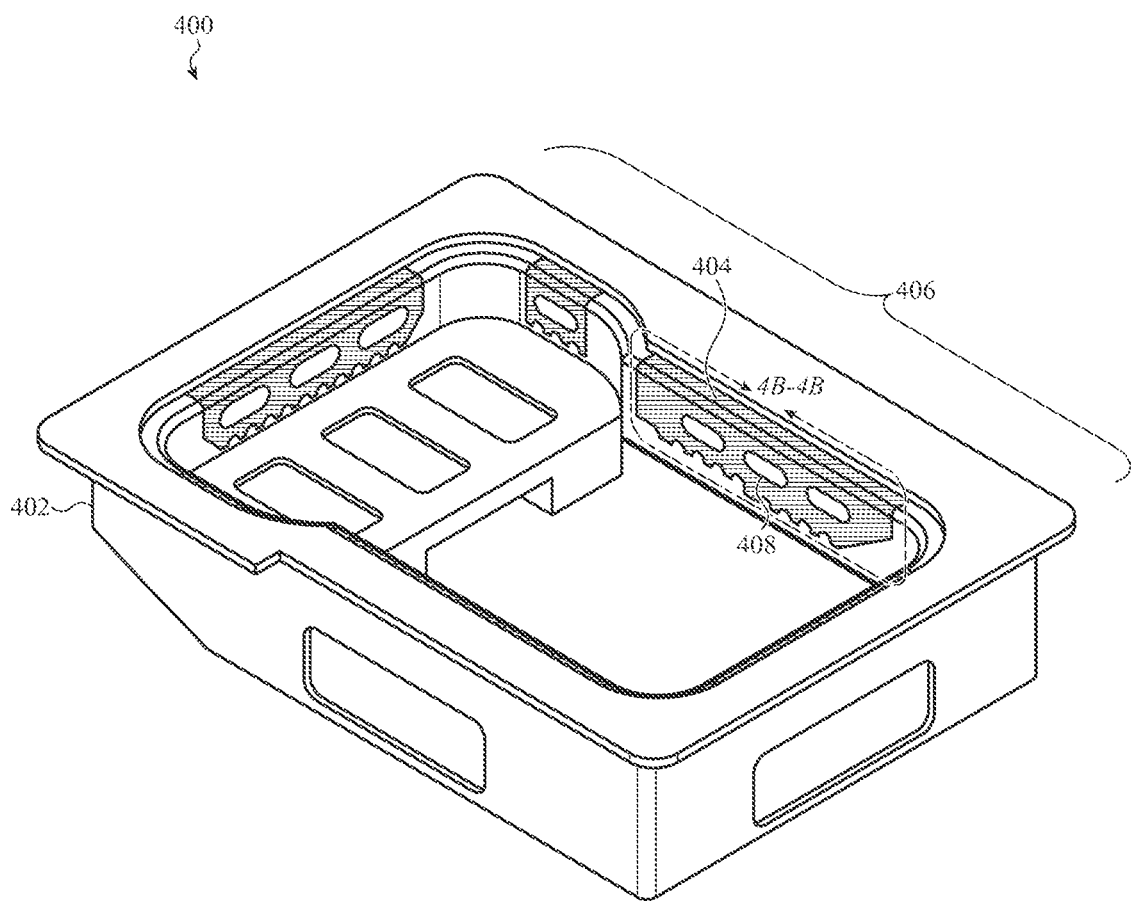
FIG. 4A shows a perspective view of a variation of a frame having interlocked structures, such as described herein.
Figure 4B:
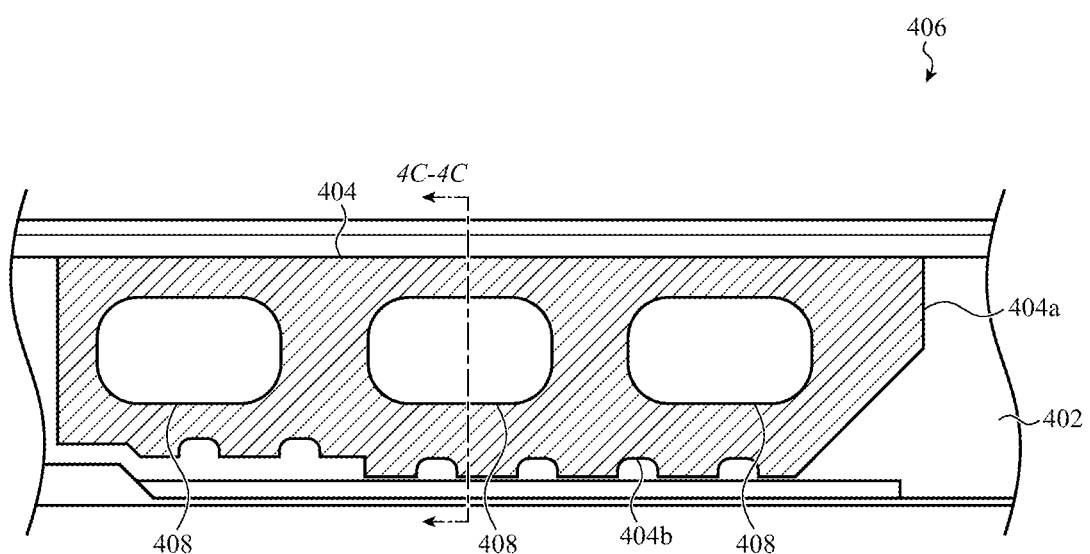
FIG. 4B shows an elevation view of the frame of FIG. 4A, taken along the line 4B-4B.

Accordingly, various embodiments of the camera modules described herein include frames that are configured to improve the connection strength between a base member and a reinforcement member. In some variations, the reinforcement member may define an opening that extends at least partially therethrough, and the base member may extend at least partially into the opening to increase the surface area of the interface between the reinforcement member and the base member. FIGS. 4A-4G illustrate various embodiments of a frame 400 with a base member 402 and a reinforcement member 404, wherein the reinforcement member 404 defines one or more openings extending therethrough. FIG. 4A is a perspective view of the frame 400, while FIG. 4B is an elevation view taken along line 4B-4B. Similar to the frame 300 (FIG. 3A), the example frame 400 has a base member 402 and a reinforcement members 404 that may be configured in any manner as described with respect to FIGS. 3A and 3B, except that the reinforcement member 404 defines at least one opening 408 extending therethrough.

Each opening increases the surface area of the interface between the reinforcement member 404 and the base member 402. The size of this interface depends at least in part on the size and shape of the opening and the thickness of the reinforcement member 404, and thus these parameters may be selected to help impart a desired connection strength between the reinforcement member 404 and the base member 402. When the base member 402 is formed, it may contact and compress against both the peripheral edges of the reinforcement member 404 as well as the perimeter edges of the openings 408. Therefore, by increasing the surface area and further interlocking the components together, the force needed to delaminate the reinforcement member 404 from the base member 402 increases. Additionally, when the optical assembly moves in an upward direction (i.e., in a direction parallel to the interior surface of the cavity of the frame), the interface between the opening and the base member may apply a countervailing force, thereby resisting relative movement in this direction.

In instances where the reinforcement member of a frame has multiple segments (e.g., such as segments 305, 306, 308, 310, and/or 312 of frame 300 of FIG. 3A) that form respective non-contiguous portions of the inner surface of a sidewall, some or all of these segments may define at least one opening extending therethrough. Similarly, in instances where a frame includes multiple separate reinforcement members, some or all of the reinforcement members may include an opening extending therethrough. Indeed, certain reinforcement members or segments thereof may not include any opening extending therethrough. Additionally, different reinforcement members or segments thereof may include different numbers of openings extending therethrough and/or openings having different shapes and/or dimensions.

The number, shape, size, and placement of openings in the reinforcement member may be determined by the weight of the optical arrangement and a level of allowable deformation before delamination. For example, a heavier optical arrangement may require more surface area between the reinforcement member and the base member to maintain the integrity of the frame during a shock event. In this example, the reinforcement member may have larger and/or more openings. The material properties of the reinforcement member and of the base member may also change the design parameters (e.g., surface area) used to prevent delamination within a deformation threshold.

FIG. 4B shows an elevation view of a section of the sidewall 406 of the frame 400, that highlights respective portions of the reinforcement member 404 and the base member 402. As discussed above, the reinforcement member defines a portion of the sidewall 406 and a portion of the inside surface thereof. The reinforcement member 404 includes a peripheral edge 404a, which may form a first interface between the reinforcement member 404 and the base member 402. Additionally, each opening 408 defines a corresponding perimeter edge of the base member 402, each of which forms an additional interface between the reinforcement member and the base member 402.

In some variations, such as shown in FIG. 4B, the reinforcement member 404 may be shaped to increase the surface area of the peripheral edge of the reinforcement member 404 and/or change the orientation of the contact area between the reinforcement member 404 and the base member 402. Indeed, the overall shape of the peripheral edge may help to determine the frame's resistance to delamination when undergoing various forces. Different portions of the peripheral edge 404a may be formed from straight or curved lines, and may be positioned at different angles within the frame 400. For example, the bottom portion of the peripheral edge may include at least one ridge 404b. Each ridge 404b increases the length of the peripheral edge 404a, and thereby increases the contact surface area between the base member and the reinforcement member.

Similarly, the interface of the edges of each opening 408 with the base member 402 increases the delamination resistance, such as when the frame is subjected to forces in a direction away from the inside surface and in a direction away from a top surface of the frame 400. Each of the openings 408 may be any shape, including circles, ovals, rounded rectangles, squares, rectangles, polygons, and so on. Each opening may further be configured with additional features that may tailor the contact between the base member 402 and the reinforcement 404. For example, FIGS. 4C-4G show cross-sectional views (each taken along the line 4C-4C) of different variations of the frames that may be used in place of frame 400 of FIGS. 4A and 4B.

Figure 4C:
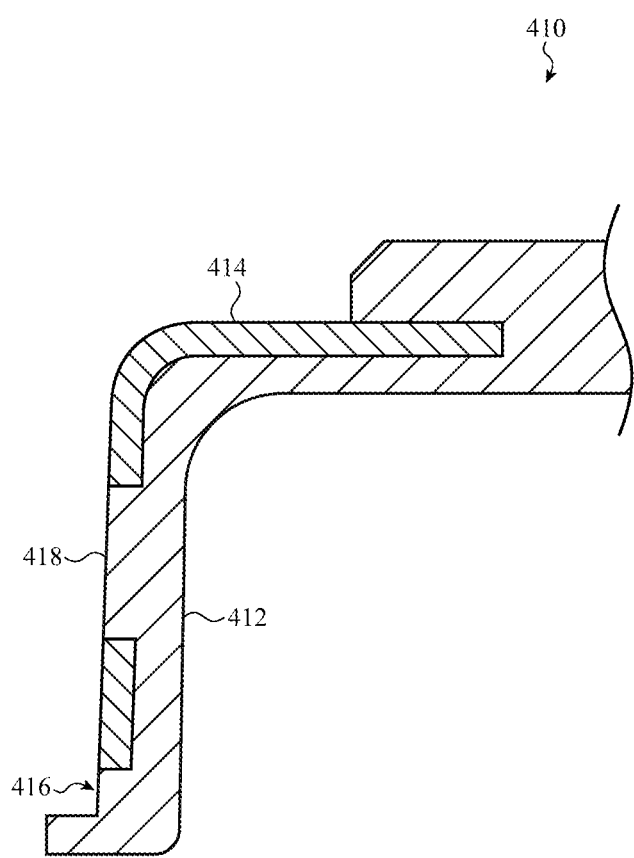
FIGS. 4C-4G show cross-sectional views of various embodiments of the frame of FIG. 4B, taken along the line 4C-4C.

FIG. 4C shows a first embodiment of a frame 410 that includes a base member 412 and a reinforcement member 414, wherein the reinforcement member 414 defines an opening 418 that has a uniform cross-sectional size. Specifically, the opening 418 of the reinforcement member 414 extends orthogonally through the thickness of the reinforcement member 414. In other words, the opening 418 extends from a first surface to a second surface of the reinforcement member 414, and its boundaries are defined by a perimeter edge of the reinforcement member that is perpendicular to the first and second surfaces of the reinforcement member 414. The frame 410 is further configured so that the base member 412 at least partially fills the opening 418 to contact the perimeter edge. In some examples, base member 412 fills the opening so that the base member 412 positioned within the opening 418 forms a flush surface with the surrounding reinforcement member 414 at an inside surface 416. In other words, the portion of the base member within the opening may be flush with the reinforcement member.

Figure 4D:
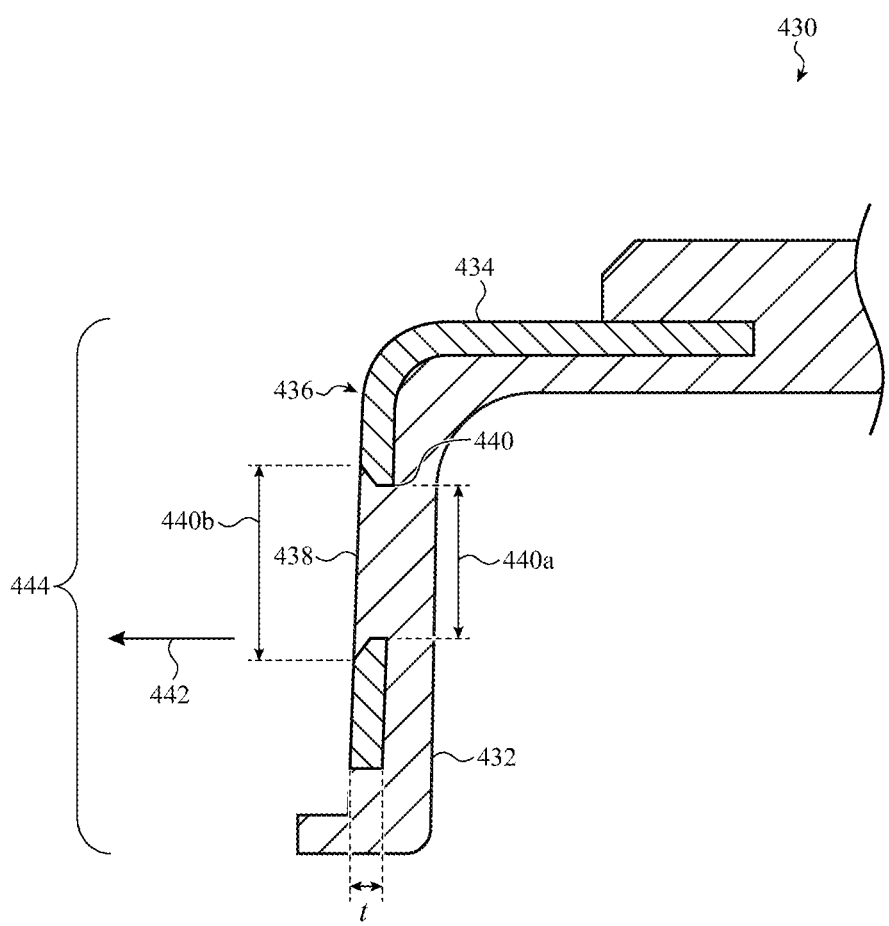

FIG. 4D shows another embodiment of a frame 430 that includes a base member 432 and a reinforcement member 434, wherein the reinforcement member 434 defines an opening 438 having a varying cross-sectional size. In some embodiments, the opening 438 of the reinforcement member 434 has a cross-sectional area that tapers along the thickness t of the reinforcement member. In this configuration, the opening 438 extends from a first surface to a second surface of the reinforcement member 434, and is bound by a tapered perimeter edge 440 of the reinforcement member that is positioned at a non-perpendicular angle to each of the first and second surfaces of the reinforcement member 434. The tapered edge 440 includes a narrower first end 440a and a wider second end 440b, where a cross-sectional area of the opening 438 increases from the narrower end to the wider end. In some embodiments, the wider end is positioned at the inside surface 436 of a sidewall 444 of the frame. In these embodiments, the opening 438 narrows in a direction away from the inside surface 436. In other words, the effective diameter of the opening 438 is larger at the inside surface 436 of the sidewall 444 (first end of the opening) than it is at an opposite side of the reinforcement member 434 (second end of the opening). In other variations, the narrower end is positioned at the inside surface 436 of a sidewall 444 of the frame. In these embodiments, the cross-sectional area of the opening 438 increases in a direction away from the inside surface 436.

The frame 430 is further configured so that the base member 432 at least partially fills the opening 438 to contact the tapered edge 440. The tapered shape of the opening 438, and the resulting contact between the reinforcement member 434 and the base member 432, may create an anchor between the base member 432 and the reinforcement member 434. During an impact or a shock event, forces exerted on the reinforcement member in a direction 442 (e.g., opposite the inside surface 436) are counteracted by the anchor and by friction between the interfacing portions of the base member to the edges of the reinforcement member. The opening 438 may be tapered in any suitable manner, such that the tapered edge 440 may have a chamfered edge, a fillet, a bevel, or the like. As with the frame 410 of FIG. 4C, the base member 432 may fill the opening 438 so that base member 432 positioned within the opening 438 forms a flush surface with the surrounding reinforcement member 434 at the inside surface 436.

Figure 4E:
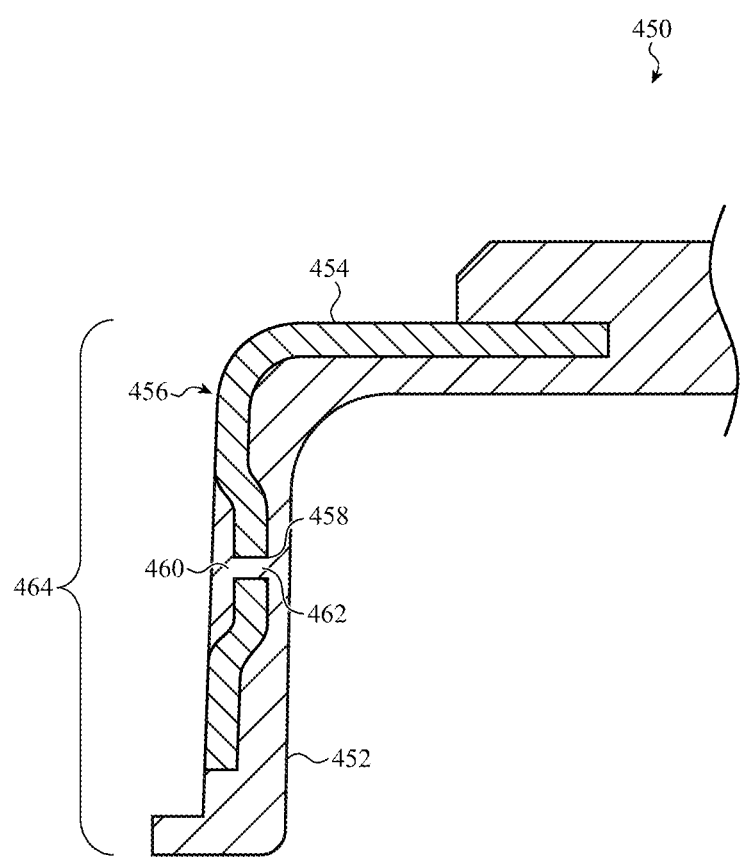

In some variations, one or more openings in a reinforcement member may be embedded into a sidewall of the frame. FIG. 4E shows one such embodiment of a frame 450 that includes a base member 452 and a reinforcement member 454, wherein the reinforcement member 454 defines an opening 458 that is embedded in a sidewall 464 of the frame 450. The configuration of the opening 458 shown here has a portion of the reinforcement member that is buried within the base member 452, and the opening 458 of the reinforcement member 454 extends through the buried portion of the reinforcement member 454. In some embodiments, the reinforcement member 454 curves inwardly from a portion of the reinforcement member 454 that defines a portion of the inside surface 456 of the sidewall 464. This inwardly curved portion defines a valley 460, and a portion of the base member 452 is positioned in the valley 460 to bury this portion of the reinforcement member 454 within the sidewall 464. The opening 458 is positioned in the buried portion of the reinforcement member 454 (e.g., at the bottom portion of the valley 462). As a result of this configuration, the part of the reinforcement member that curves inwards, including the opening 458, is occluded by the base member (e.g., buried). Specifically, the base member 452 may extend through the opening 458 and fills at least a portion of valley 460. Similar to the benefits described in FIG. 4C above, the buried portion of the reinforcement member, as well as the opening 458, creates an anchor with respect to the base member which helps to prevent delamination of the reinforcement member. It should be appreciated that the opening 458 may be otherwise configured as described herein with respect to FIGS. 4C, 4D, and 4G.

Figure 4F:
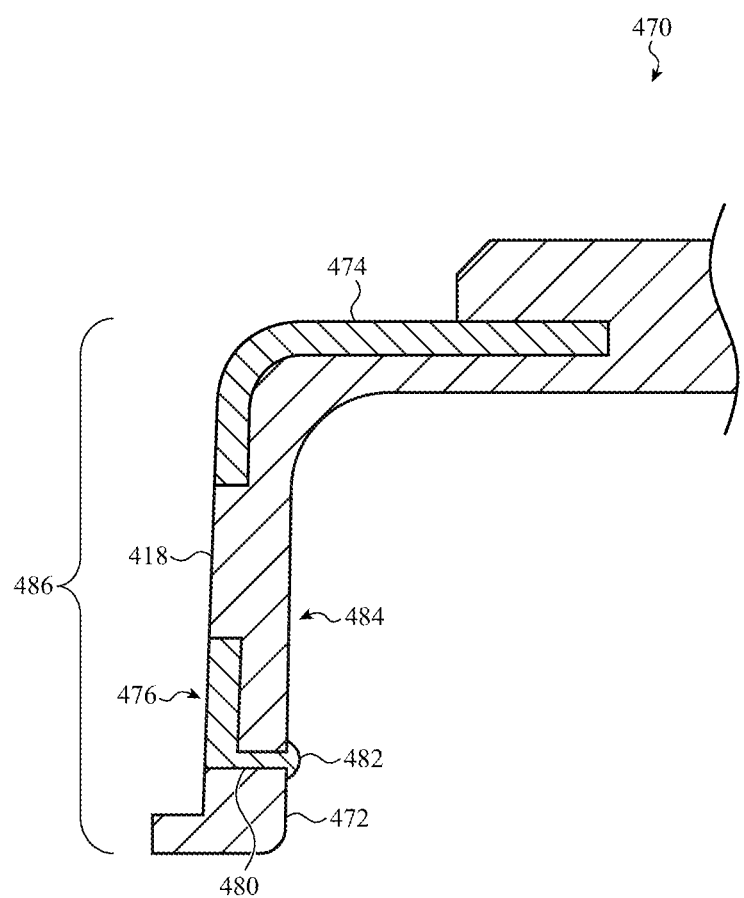

In some variations, the reinforcement member may include on or more additional structures configured to anchor the reinforcement member to the base member. FIG. 4F shows one such embodiment of a frame 470 that includes a base member 472 and a reinforcement member 474, wherein the reinforcement member 474 includes an anchor 480 extending through the sidewall 486. The reinforcement member 474 includes an opening 418 such as described with respect to FIG. 4C, though it should be appreciated that the opening 418 may instead be configured as described with respect to FIGS. 4D, 4E, and 4G. As shown in FIG. 4F, a portion of the reinforcement member 474 forming the anchor 480 may be shaped such that it protrudes through the sidewall 486 to an outside surface 484 (e.g., opposite inside surface) of the sidewall 486. For example, a bottom portion of the reinforcement member may be bent such that the bottom portion forms the anchor 480. The base member 472 may be formed around the reinforcement member 474 such that the anchor 480 extends through an aperture in the base member 472.

The anchor 480 terminates at a cap 482. In some embodiments, the a cross-sectional dimension of the cap 482 is larger than a corresponding cross-sectional dimension of the aperture in the base member 472. In these instances, the cap 482 may resist being pulled through the aperture in the base member 472, which may help prevent the reinforcement member 474 from delaminating from the base member 472. In some embodiments, the reinforcement member 474 has multiple anchors. It should also be appreciated that in some instances, such as described with respect to FIGS. 6A-6D, a reinforcement member may include an anchor (such as anchor 480) but not an opening extending therethrough.

Figure 4G:
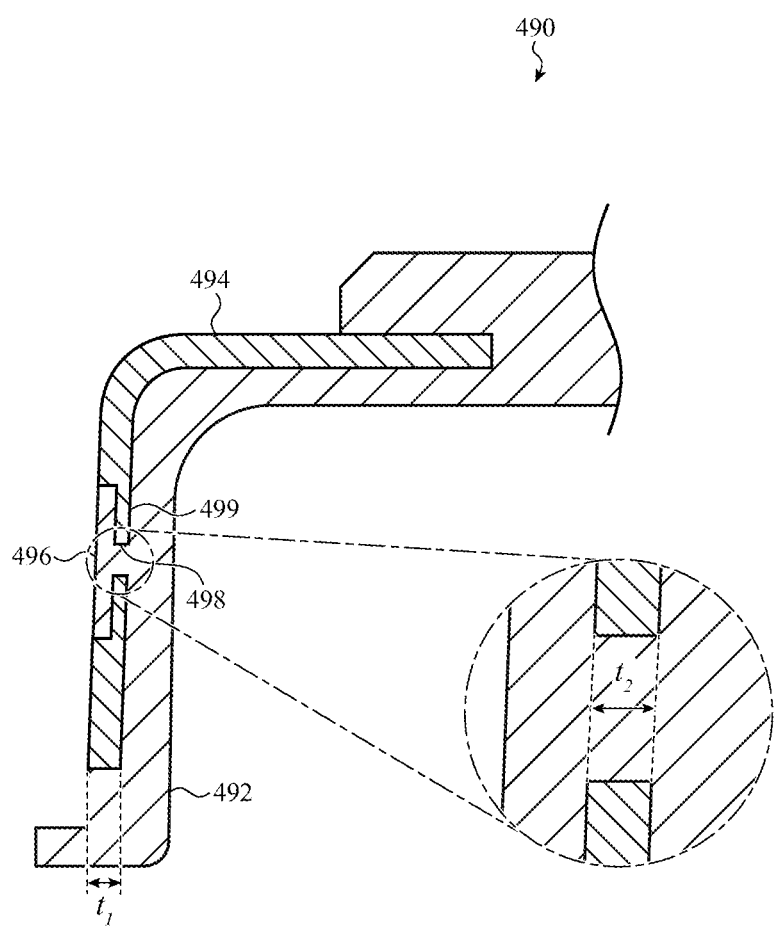

In some variations, a reinforcement member may have an opening with a stepped cross-sectional area. FIG. 4G shows another embodiment of a frame 490 that includes a base member 492 and a reinforcement member 494, wherein the reinforcement member 494 defines an opening 496 having a stepped cross-sectional size. For example, a surface of the reinforcement member 494 may be etched to create one or more discrete steps at which the cross-sectional area of the opening 496 changes. As a result of the etching, the reinforcement member defines a thinned portion 499 which defines a portion of the opening 496 of the reinforcement member 494. The thickness $t_2$ of the thinned portion 499 is smaller than the thickness $t_1$ of the reinforcement member 494. Accordingly, the opening 496 includes a first section (defined by the thinned portion 499) and a second section (defined by the surrounding portion of the reinforcement member), where the first section has a smaller cross-sectional area than the second section. In this way, the opening 496 has a stepped outer perimeter 498. Additionally, the base member 492 at least partially fills the opening 496 (such as described above with respect to FIG. 4C), which may help to prevent delamination of the reinforcement member 494. In some instances, the portion of the base member 492 that fills the opening 496 may be flush with a surface of the reinforcement member 494, such as described herein.

Figure 5A:
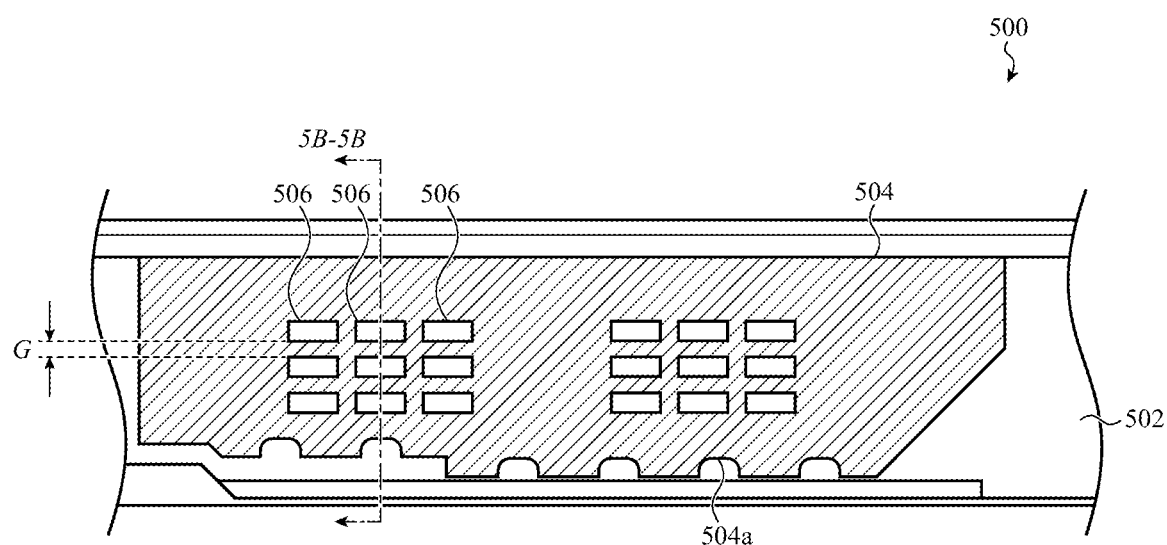
FIG. 5A shows an elevation view of a portion of a variation of a frame having interlocked structures, such as described herein.
Figure 5B:
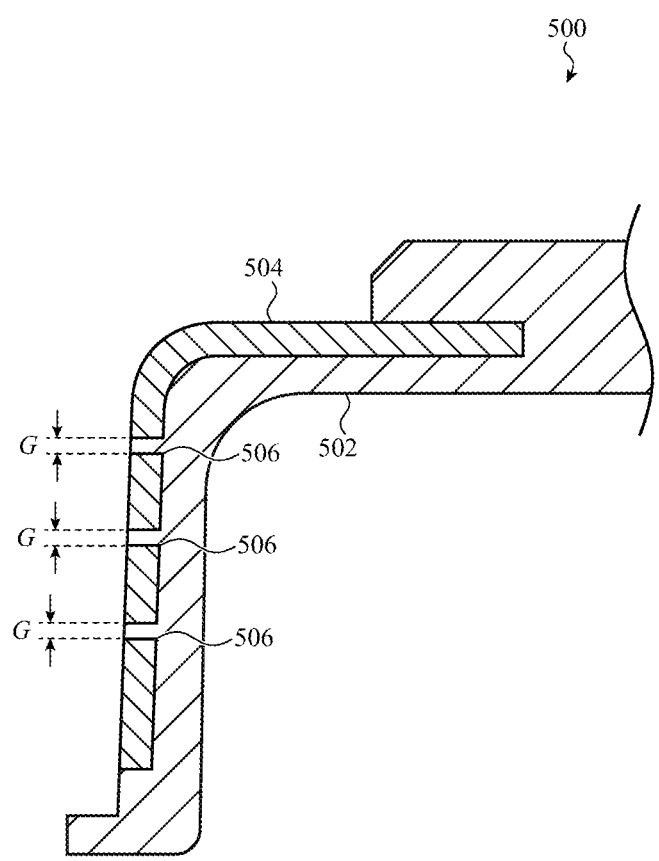
FIG. 5B shows a cross-section view of the frame of FIG. 5A, taken along line 5B-5B.

In some instances, it may be desirable for the reinforcement member to have multiple smaller openings rather than a single, larger opening. This may allow for an increase in the contact area between the base member and edges of the reinforcement member (thereby reducing the risk of delamination) while allowing the reinforcement member to form a larger proportion of the inside surface of the frame's sidewall (thereby improving the bonding between the optical assembly and the frame). FIG. 5A is an elevation view of a portion of a sidewall of a frame 500 that may be used in the camera modules described herein. FIG. 5B shows a cross sectional view of frame 500 taken along the line 5B-5B. The frame 500 comprises a base member 502 and a reinforcement member 504, wherein the reinforcement member 504 includes a plurality of openings 506 arranged as an array. The plurality of openings 506 may be formed as a two-dimensional array (such as shown in FIG. 5A) in which the openings 506 are arranged in rows and columns, may be formed as a one-dimensional array, or may be positioned according to another arrangement (such as a repeating pattern or pseudo-random arrangement). In some instances, the plurality of openings 506 may be grouped into one or more sub-arrays. Each of the openings within a subarray may be separated by a gap G, though it should be appreciated that this gap may vary between rows and/or columns The reinforcement member 504 defines a peripheral edge 504a, which may include ridges and/or diagonal features such as described herein. As explained above, the peripheral edge 504a, along with each perimeter edge of the plurality of openings 506, forms interfaces between the reinforcement member 504 and the base member 502 which increases the bonding strength between these members and increases the force needed to separate these members. In the variation shown in FIGS. 5A-5B, each opening 506 is smaller than the openings described with respect to FIGS. 4A-4F, which may allow a larger number of openings in a given area of the reinforcement member 504. This may increase the interface surface area between the reinforcement member 504 and the base member 502 while allowing the optical assembly to be adhered to a relatively larger proportion of the reinforcement member 504 relative to the base member 502.

In some variations, the reinforcement member and the base member are also adhered using a low viscosity adhesive. For example, the frame may be formed using an insert molding process, as explained above. The frame may then be dipped into an adhesive with sufficiently low viscosity to allow the adhesive to fill interstices between the reinforcement member and the base member thereby forming an adhesive layer. In this configuration, the optical assembly is coupled to a larger portion of the reinforcement member (e.g., more metal to glass adhesion), which may form a stronger bond than the optical assembly to base member interface. Such a low viscosity adhesive may be combined with any other embodiment described herein, such as those described in FIGS. 4A-5B and FIGS. 6A-6D.

Figure 6A:
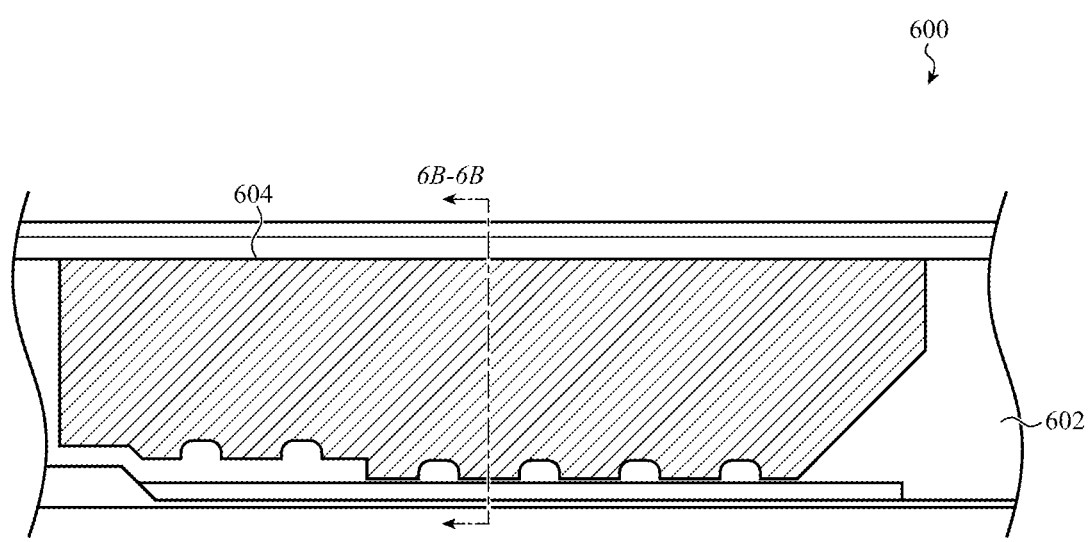
FIG. 6A shows an elevation view of a portion of a variation of a frame with interlocked structures, such as described herein.

In some embodiments, the reinforcement member does not have an opening. FIGS. 6A-6D depict an embodiment where the reinforcement member is further coupled to the base member via a rivet-like structure extending through the reinforcement member, such as the anchor 480 described with respect to FIG. 4F. The structure shown in the figure acts as a fastener to couple the reinforcement member to the base member. The benefits of this structure are that the optical assembly may be adhered to more surface area of the reinforcement member compared to the embodiments where the reinforcement member comprises an opening. This may improve the adhesion of the optical assembly to the overall frame because the bonding strength between the optical assembly and the reinforcement member is larger than the bonding strength between the optical assembly and the base member. FIG. 6A shows an elevation view of a portion of sidewall of a frame 600 as described herein. The sidewall 600 comprises a base member 602 and a reinforcement member 604. In this configuration, the reinforcement member comprises an anchor 612 and a cap 632, which extend through the base member and fixedly couple the base member to the reinforcement member.

Figure 6B:
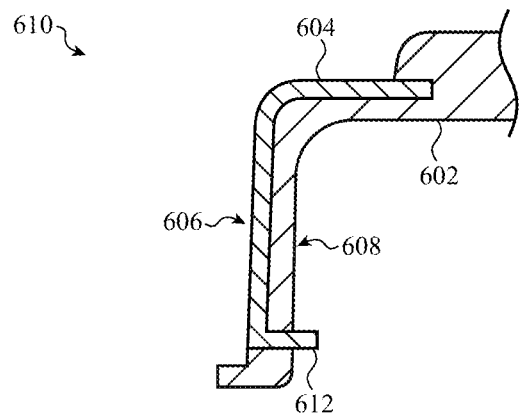
FIGS. 6B-6D show cross-sectional side views, taken along line 6B-6B, of a process of fabricating the frame of FIG. 6A.
Figure 6C:
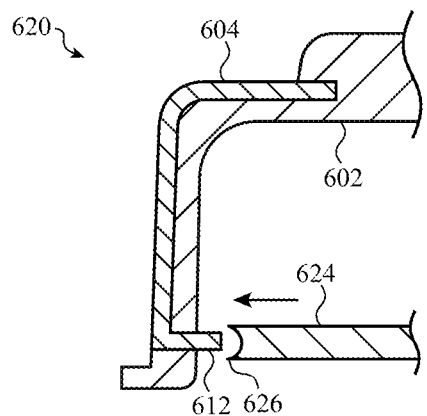
Figure 6D:
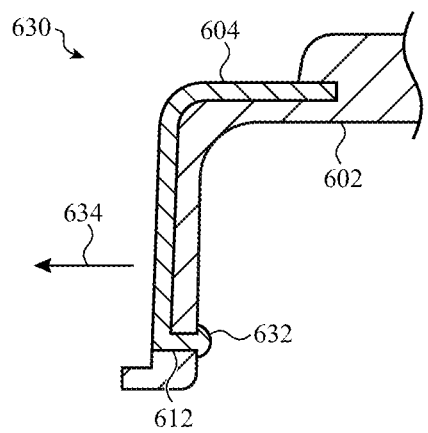

FIGS. 6B-6D show the steps of forming the rivet-like structure on the sidewall. At step 610, the base member 602 is formed around the reinforcement member 604. A portion of the reinforcement member 604 forming the anchor 612 (e.g., formed by a portion of the reinforcement member 604) extends from the inside surface 606 of the sidewall to the outside surface 608 of the sidewall and protrudes from the base member 602 at the outside surface 608. While the anchor is shown at the bottom portion of the reinforcement member 604, other positions of the anchor along the reinforcement member 604 (and thereby along different portions of the sidewall) are possible. At step 620, a press 624 having an end 626 is pressed over the anchor 612. The end 626 of the press may have a domed shape that accommodates the outside dimensions of the anchor 612. As the press pushes on the anchor 612 in a direction towards the sidewall (while optionally heating the reinforcement member 604), the rod deforms around the surrounding portion of the base member 602 defining the outside surface 608. Step 630 shows the cap 632 of the reinforcement member after pressing the anchor 612. The shape of the cap 632 approximates the end 626 of the press. The diameter of the cap 632 is larger than the effective diameter of the aperture encircling the anchor 612. When a force is applied in a direction 634 away from the inside surface, the surface of the cap interfacing with the base member is configured to counteract the force and thus prevent delamination of the reinforcement member from the base member.

These foregoing embodiments depicted in FIGS. 1A-6D and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A camera module comprising:
an optical assembly comprising an optical element;
an image sensor positioned to receive light through the optical assembly; and
a frame having a sidewall and comprising:
a reinforcement member defining:
a first portion of the sidewall of the frame,
an opening; and
a peripheral edge; and
a base member extending at least partially through the opening and surrounding at least a portion of the peripheral edge of the reinforcement member, the base member defining a second portion of the sidewall of the frame,
wherein the optical assembly is coupled to the sidewall of the frame.

2. The camera module of claim 1, wherein:
the opening extends from a first surface of the reinforcement member to a second surface of the reinforcement member; and
the opening is bound by a tapered perimeter edge of the reinforcement member that is positioned at a non-perpendicular angle to each of the first surface of the reinforcement member and the second surface of the reinforcement member.

3. The camera module of claim 1, wherein:
a portion of the reinforcement member curves inwardly from an inside surface of the sidewall; and
the base member extends through the opening and fills the portion of the reinforcement member that curves inwardly to embed the portion of the reinforcement member into the sidewall.

4. The camera module of claim 1, wherein:
a portion of the reinforcement member protrudes through the base member to an outside surface; and
the protruding portion of the reinforcement member forms an anchor against the base member.

5. The camera module of claim 1, wherein the reinforcement member is made from metal.

6. The camera module of claim 5, wherein the base member is made from a polymer.

7. The camera module of claim 1, wherein:
the peripheral edge of the reinforcement member defines at least one ridge; and
the base member extends around the at least one ridge.

8. The camera module of claim 1, wherein:
the opening is a through opening;
the base member extends through the opening; and
the base member and the reinforcement member form a flush surface at an inside surface of the sidewall.

9. A frame configured to support an optical assembly comprising at least one optical element and defining an inside perimeter to which the optical assembly is coupled, the frame comprising:
a reinforcement member defining a first surface of the inside perimeter and defining an opening; and
a base member coupled to the reinforcement member, wherein:
a first portion of the base member fills the opening of the reinforcement member; and
the first portion of the base member defines a second surface of the inside perimeter.

10. The frame of claim 9, wherein:
the opening defines a first end positioned at the first surface of the inside perimeter and a second end opposite the first end;
the opening extends from the first end to the second end; and
a cross-sectional area of the opening increases in a direction away from the first surface.

11. The frame of claim 9, wherein the first surface of the inside perimeter and the second surface of the inside perimeter are flush.

12. The frame of claim 9, wherein:

the base member extends through the opening and over a portion of the reinforcement member to define the second surface of the inside perimeter.

13. The frame of claim 9, wherein the first surface of the inside perimeter is larger than the second surface of the inside perimeter.

14. The frame of claim 9, wherein the reinforcement member is a first reinforcement member and the opening is a first opening and further comprising:

a second reinforcement member defining a third surface of the inside perimeter and defining a second opening, wherein:

the base member is coupled to the second reinforcement member;

a second portion of the base member fills the second opening of the reinforcement member; and the second portion of the base member defines a fourth surface of the inside perimeter.

15. A camera module comprising:

an optical assembly comprising an optical element;

an image sensor receiving light through the optical assembly; and a sidewall defining an inside surface and a top surface, wherein the optical assembly is coupled to the inside surface, the sidewall comprising:

a reinforcement member defining:

at least one opening;

a first portion of the inside surface; and a first portion of the top surface; and a base member defining:

a second portion of the inside surface; and a second portion of the top surface, wherein a first portion of the base member extends at least partially into the at least one opening of the reinforcement member to interlock the base member with the reinforcement member.

16. The camera module of claim 15, wherein:

the at least one opening is a plurality of openings arranged as an array; and the base member extends into each opening of the plurality of openings.

17. The camera module of claim 15, wherein:

the sidewall defines a cavity and at least partially encircles the optical assembly; and the camera module comprises a shelf at least partially defining a portion of the cavity and extending from a first side of the cavity to an opposite side of the cavity, the shelf configured to at least partially support the optical assembly.

18. The camera module of claim 15, wherein:

the reinforcement member defines an end; and the end of the reinforcement member extends partially through a portion of the base member at the top surface to interlock the base member with the reinforcement member at the end.

19. The camera module of claim 15, wherein a strength of the reinforcement member is larger than a strength of the base member.

20. The camera module of claim 15, wherein the reinforcement member defines a stepped cross-sectional area of the at least one opening.

* * * * *